(12) United States Patent
Li et al.

(10) Patent No.: US 12,542,587 B2
(45) Date of Patent: *Feb. 3, 2026

(54) PERIODIC CHANNEL STATE INFORMATION (CSI) MEASUREMENT GAP FOR BANDWIDTH LIMITED LOW COMPLEXITY USER EQUIPMENTS

(71) Applicant: QUALCOMM Incorporated, San Diego, CA (US)

(72) Inventors: Qiaoyu Li, Beijing (CN); Chao Wei, Beijing (CN); Yu Zhang, San Diego, CA (US); Peter Pui Lok Ang, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 17/794,597

(22) PCT Filed: Jan. 23, 2020

(86) PCT No.: PCT/CN2020/073992
§ 371 (c)(1),
(2) Date: Jul. 21, 2022

(87) PCT Pub. No.: WO2021/147080
PCT Pub. Date: Jul. 29, 2021

(65) Prior Publication Data
US 2023/0106254 A1   Apr. 6, 2023

(51) Int. Cl.
*H04B 7/06* (2006.01)
*H04L 5/00* (2006.01)
*H04W 24/10* (2009.01)

(52) U.S. Cl.
CPC ......... *H04B 7/0626* (2013.01); *H04L 5/0057* (2013.01); *H04W 24/10* (2013.01)

(58) Field of Classification Search
CPC ... H04B 7/0626; H04L 5/0057; H04L 5/0048; H04L 5/0094; H04L 5/001; H04W 24/10;
(Continued)

(56) References Cited

U.S. PATENT DOCUMENTS

2017/0310384 A1  10/2017 Park et al.
2019/0075585 A1   3/2019 Deogun et al.
(Continued)

FOREIGN PATENT DOCUMENTS

CN    110012498 A    7/2019
CN    110572879 A   12/2019
(Continued)

OTHER PUBLICATIONS

Supplementary European Search Report—EP20915897—Search Authority—MUNICH—Sep. 15, 2023.
(Continued)

*Primary Examiner* — Yu-Wen Chang
(74) *Attorney, Agent, or Firm* — Loza & Loza, LLP

(57) ABSTRACT

Aspects of the disclosure relate to a user equipment (UE) configured to operate within an active bandwidth part (BWP) of a component carrier, wherein the active BWP is a portion of a total bandwidth of the component carrier. The UE is further configured to determine a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the active BWP, measure the channel state information (CSI) measurement resources within the periodic channel state information (CSI) measurement gap, and
(Continued)

transmit a channel state information (CSI) report based on the measured channel state information (CSI) measurement resources.

35 Claims, 8 Drawing Sheets

(58) Field of Classification Search
CPC .... H04W 36/0088; H04W 8/24; H04W 36/0058
See application file for complete search history.

(56) References Cited

U.S. PATENT DOCUMENTS

| | | | |
|---|---|---|---|
| 2019/0166513 A1* | 5/2019 | Lin | H04W 24/10 |
| 2019/0349123 A1 | 11/2019 | Virtanen et al. | |
| 2019/0349964 A1 | 11/2019 | Liou | |
| 2019/0394710 A1 | 12/2019 | Ugurlu et al. | |
| 2020/0037260 A1* | 1/2020 | Fu | H04W 52/325 |
| 2020/0052942 A1* | 2/2020 | Lin | H04W 36/0088 |
| 2021/0298038 A1* | 9/2021 | Kang | H04L 5/0057 |
| 2021/0345293 A1* | 11/2021 | Park | H04L 5/001 |
| 2022/0007365 A1* | 1/2022 | Jung | H04W 24/10 |
| 2022/0264593 A1 | 8/2022 | Wang | |
| 2023/0042538 A1* | 2/2023 | Sun | H04L 5/0094 |
| 2023/0144865 A1 | 5/2023 | Li et al. | |

FOREIGN PATENT DOCUMENTS

| | | |
|---|---|---|
| EP | 3644523 A1 | 4/2020 |
| WO | 2018236180 A1 | 12/2018 |
| WO | WO-2019029597 A1 | 2/2019 |
| WO | 2019159390 A1 | 8/2019 |

OTHER PUBLICATIONS

International Search Report and Written Opinion—PCT/CN2020/073992—ISA/CN—Oct. 29, 2020.
Mediatek Inc: "Remaining Details on Bandwidth Part Operation in NR", 3GPP Draft, 3GPP TSG RAN WG1 Meeting #90bis, R1-1718327_Remaining Details on Bandwidth Part Operation in NR, 3rd Generation Partnership Project (3GPP), Mobile Competence Centre, 650, Route Des Lucioles, F-06921 Sophia-Antipolis Cedex, vol. RAN WG1, No. Prague, CZ, Oct. 9, 2017-Oct. 13, 2017, Oct. 8, 2017, Oct. 3, 2017, XP051341510, [Jul. 20, 2018], 13 Pages, Oct. 3, 2017, Retrieved from the Internet: URL: http://www.3gpp.org/ftp/tsg_ran/WG1_RL1/TSGR1_90b/Docs/R1-1718327.zip [retrieved on Oct. 8, 2017], Sections 2-6, Parts 2 and 4-5.
Mediatek Inc: "Remaining Details on Bandwidth Part Operation in NR", 3GPP Draft, 3GPP TSG RAN WG1 Meeting 91, R1-1719551_Remaining Details on Bandwidth Part Operation in NR, 3rd Generation Partnership Project (3GPP), Mobile Competence Centre, 650, Route Des Lucioles, F-06921 Sophia-Antipolis Ced, vol. RAN WG1, No. Reno, USA, Nov. 27, 2017-Dec. 1, 2017, Nov. 18, 2017 (Nov. 18, 2017), XP051369365, 10 Pages, Retrieved from the Internet: URL:http://www.3gpp.org/ftp/tsg%5Fran/WG1%5FRL1/TSGR1%5F91/Docs/ [retrieved on Nov. 18, 2017], Sections 2-5.

* cited by examiner

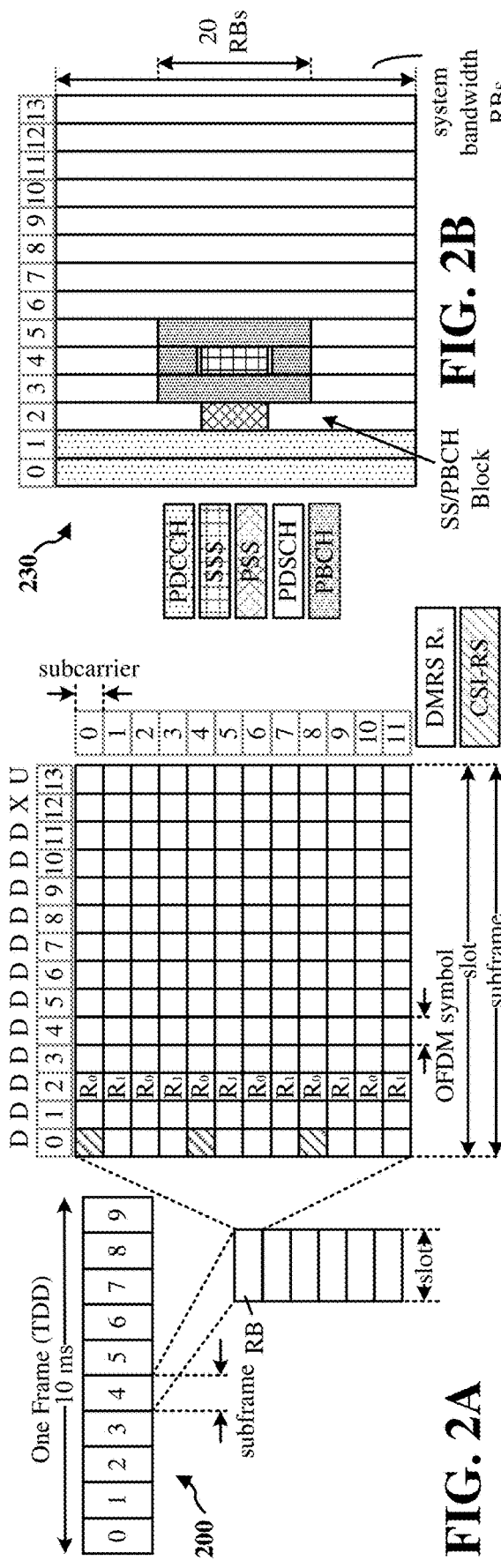
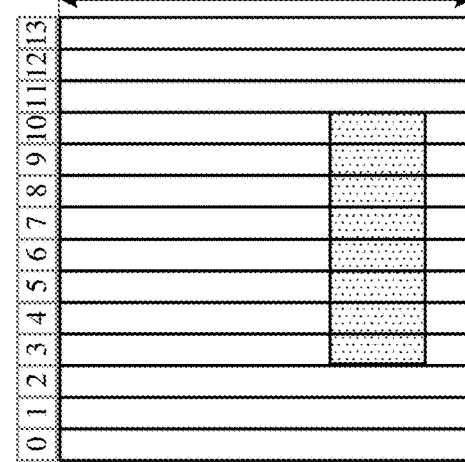
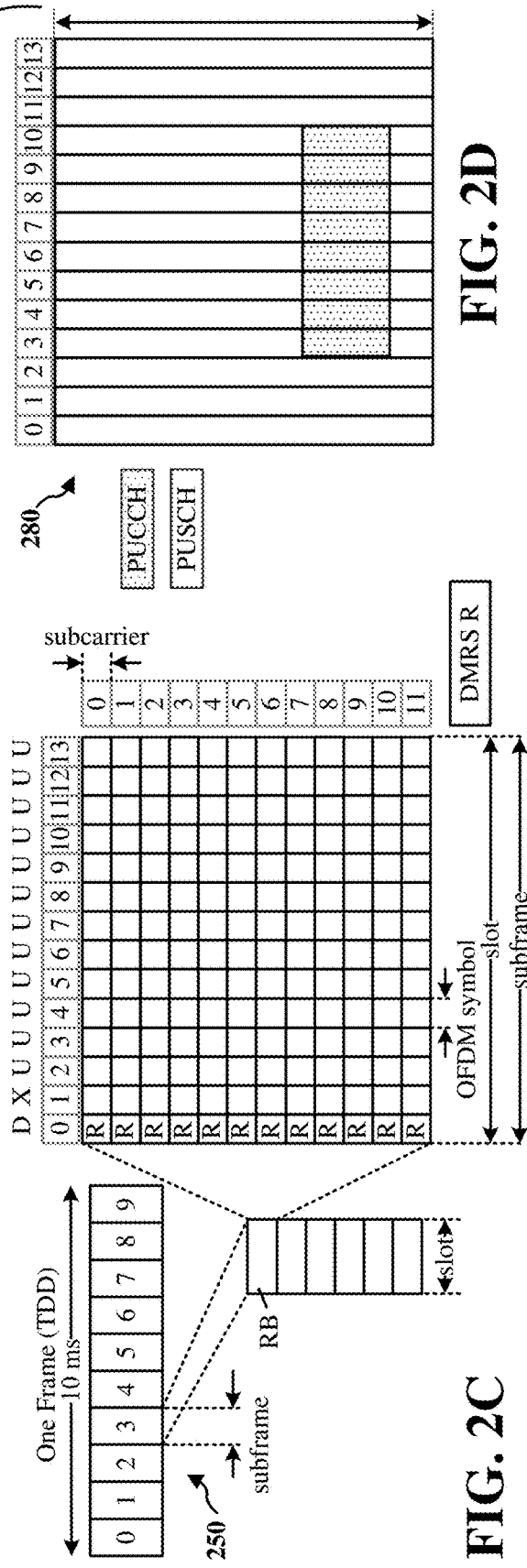

PERIODIC CHANNEL STATE INFORMATION (CSI) MEASUREMENT GAP FOR BANDWIDTH LIMITED LOW COMPLEXITY USER EQUIPMENTS

CROSS-REFERENCE TO RELATED APPLICATION

The present application claims priority to and the benefit of PCT patent application serial no. PCT/CN2020/073992, filed in the China Intellectual Property Office on Jan. 23, 2020, the entire content of which is incorporated herein by reference as if fully set forth below in its entirety and for all applicable purposes.

BACKGROUND

Technical Field

The present disclosure relates generally to communication systems, and more particularly, to a periodic channel state information (CSI) measurement gap for bandwidth limited low complexity user equipment (UEs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the disclosure relate to a user equipment (UE) configured to operate within an active bandwidth part (BWP) of a component carrier, wherein the active BWP is a portion of a total bandwidth of the component carrier. The UE is further configured to determine a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the active BWP, measure the channel state information (CSI) measurement resources within the periodic channel state information (CSI) measurement gap, and transmit a channel state information (CSI) report based on the measured channel state information (CSI) measurement resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
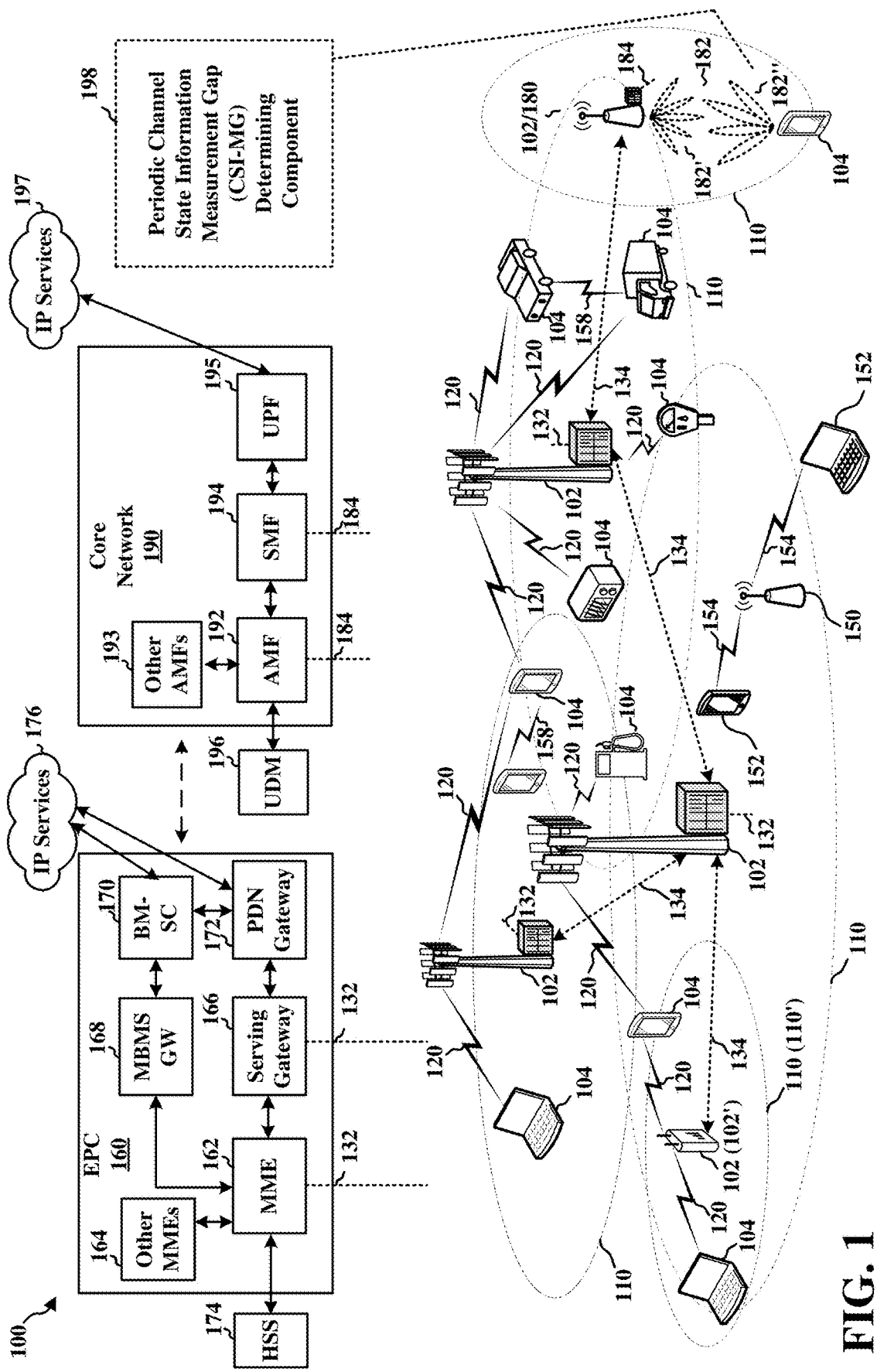
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a periodic channel state information (CSI) measurement gap determining component 198. The periodic CSI measurement gap may include periodic CSI measurement resources (e.g., CSI measurement resources transmitted by the base station 102) that are within the total bandwidth of the component carrier and outside of an active bandwidth part of the UE 104.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may implement a frequency division duplex (FDD) scheme in which for a particular set of subcarriers (carrier system bandwidth), subframes within the set of subcarriers are dedicated for either DL or UL, or may implement a time division duplex (TDD) scheme in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high Throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
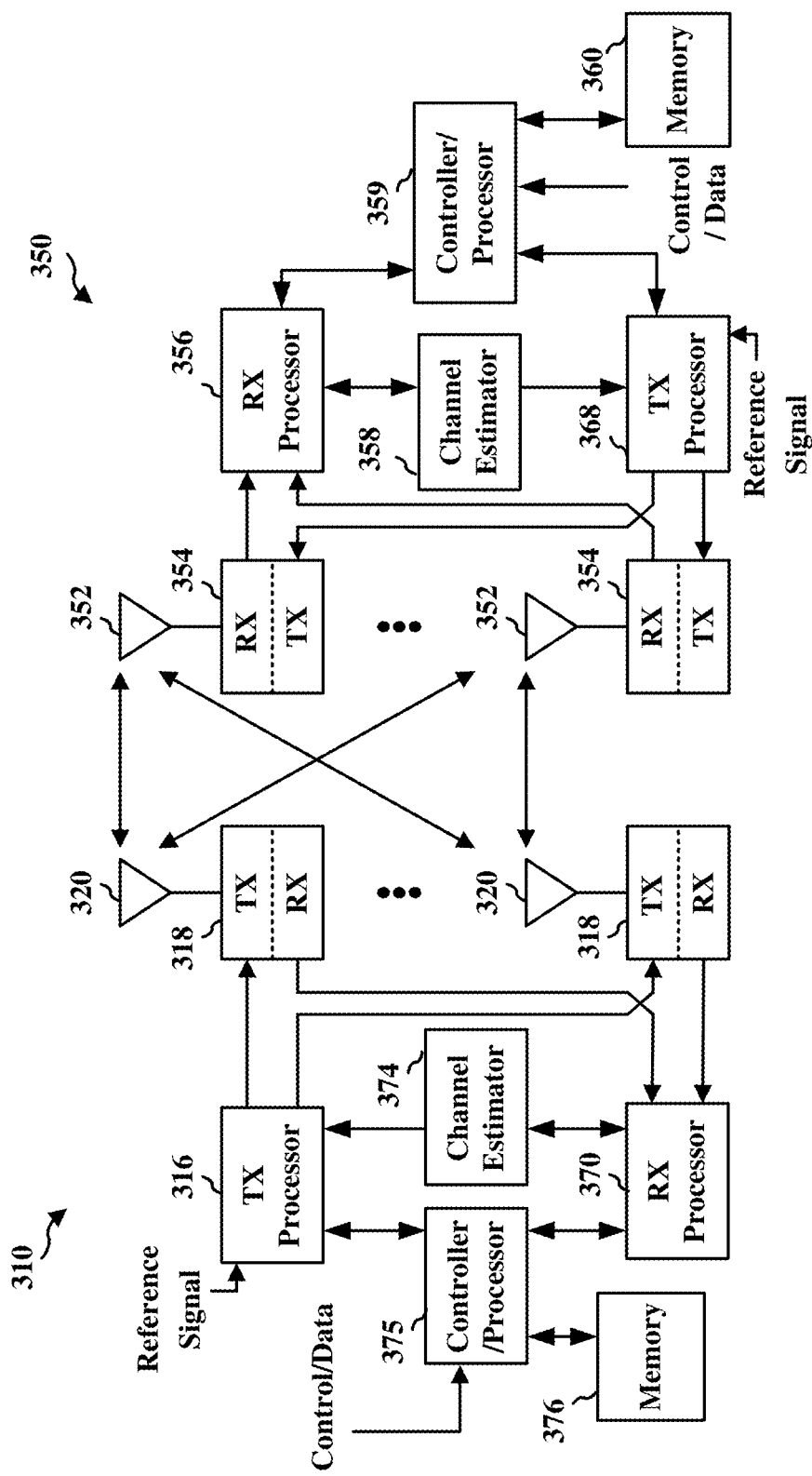
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment. RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FIT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition. RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the periodic channel state information measurement gap (CSI-MG) determining component 198 of FIG. 1.

5G NR networks may implement a set of features (also referred to as NR-Light) that supports reduced complexity UEs. In some examples, reduced complexity UEs may include wearable devices, industrial sensors, video surveillance devices (e.g., stationary cameras), and/or other suitable devices. As compared to standard UEs (e.g., smartphones), reduced complexity UEs may have a lower wireless transmission power, fewer antennas (e.g., antennas for transmitting and/or receiving), a reduced bandwidth for wireless transmission and/or reception, reduced computational complexity/memory, and/or longer battery life. For example, a reduced complexity UE may have a bandwidth in the range of 5.0 MHz to 20 MHz, while a standard UE may have a bandwidth of 100 MHz. One example goal of the present disclosure is to enhance co-existence among 5G NR reduced complexity UEs and 5G NR standard UEs.

5G NR networks may support very large operating bandwidths relative to previous generations of cellular networks (e.g., LTE). However, requiring a UE to operate across the entire bandwidth of a 5G NR network may introduce unnecessary complexities to the operation of the UE and may significantly increase a UE's power consumption. Therefore, to avoid the need for the operating bandwidth of a UE to match the full bandwidth (also referred to as a carrier bandwidth or a component carrier bandwidth) of a cell in a 5G NR network, 5G NR introduces the concept of a bandwidth part (BWP). For example, a BWP (e.g., a configured frequency band) may allow a UE to operate with a narrower bandwidth (e.g., for wireless transmission and/or reception) than the full bandwidth of a cell. In some examples, bandwidth parts (BWPs) may allow UEs with different bandwidth capabilities to operate in a cell with smaller instantaneous bandwidths relative to the full bandwidth configured for the cell. In some examples, a UE may not be required to transmit and or receive outside of the BWP assigned to the UE (also referred to as an active BWP of the UE).

In some examples, for a paired spectrum, a serving cell may configure a maximum of four DL BWPs and four UL BWPs. For an unpaired spectrum, a serving cell may configure a maximum of four DU/UL BWP pairs. For a supplementary uplink (SUL), a serving cell may configure a maximum of 4 UL BWPs.

In some examples, for FDD, a serving cell may support separate sets of BWP configurations for DL and UL per component carrier (CC). DL and UL BWPs may be configured separately and independently for each UE-specific serving cell. The numerology of a DL BWP configuration may apply to PDCCH and PDSCH. The numerology of a UL BWP configuration may apply to PUCCH and PUSCH.

In some examples, for TDD, a serving cell may support a joint set of BWP configurations for DL and UL per CC. DL and UL BWPs may be jointly configured as a pair, with the restriction that the DL/UL BWP pair shares the same center frequency but may be of different bandwidths for each UE-specific serving cell for a UE. The numerology of the DL/UL BWP configuration may apply to PDCCH. PDSCH, PUCCH, and PUSCH. For a UE, if different active DL and UL BWPs are configured, the UE is not expected to retune the center frequency of the channel bandwidth between DL and UL. Supporting the ability to switch a BWP among multiple BWPs is memory consuming, since each BWP requires a whole set of RRC configurations.

In a 5G NR network, when a UE is to perform a channel state information (CSI) measurement, the UE may be expected to perform the CSI measurement only within its active DL BWP. Otherwise, to perform a CSI measurement outside of its current active BWP, the UE would typically need to switch from its current active BWP to a different BWP (e.g., a different BWP that does not overlap with the current active BWP). Furthermore, and as described below, a UE may need measurement gaps (MGs) to identify and measure at least one of an intra-frequency cell, an inter-frequency cell, or an inter-RAT E-UTRAN cell.

Measurement gaps (MGs) may be RRC configured with a measurement gap length (MGL), a measurement gap repetition period (MGRP), and a measurement gap timing advance (MGTA). In some examples, the measurement gap length (MGL) may be within a range of 1.5 milliseconds (ms) to 6.0 ms depending on frequency range. In some examples, the measurement gap repetition period (MGRP) may be within a range of 20 ms to 160 ms. In some examples, the measurement gap timing advance (MGTA) may be 0 ms, 0.25 ms, or 0.5 ms. During a measurement gap (MG), the UE may not be expected to transmit or receive within the active BWP. In some examples, the previously described measurement gaps (MGs) may be used mainly for L3-based cell reselection or carrier reselection.

Radio resource control (RRC) for channel state information (CSI) reporting and CSI Resource Frequency Occupation will now be discussed. A UE may receive a CSI report configuration, which may define a CSI reporting band as a subset of subbands of the bandwidth part (BWP). The CSI reporting band may indicate a contiguous or non-contiguous subset of subbands in the BWP for which CSI is to be reported. The CSI reporting band may be indicated using a bitmap, such as a bit string where each bit in the bitstring represents one subband. For example, the right-most bit in the bit string may represents the lowest subband in the BWP. The number of subbands represented by the bitstring (e.g., the length of the bitstring) may be set based on a value or term included in a certain field (also referred to as a choice field) of the CSI report configuration. For example, "subbands3" may be included in the choice field to indicate three subbands, which may set the length of the bit string to three bits. As another example, "subbands4" may be included in the choice field to indicate four subbands, which may set the length of the bit string to four bits. The choice field may be omitted (or may not include any value) if there are less than 24 PRBs (no subband) and present otherwise. In some examples, the number of subbands may be from three (e.g., 24 PRBs, subband size 8) to 18 (e.g., 72 PRBs, sub band size 4).

A UE may receive a CSI resource configuration, which may indicate a CSI frequency occupation (also referred to as a frequency domain occupation) within the BWP. In some examples, the CSI frequency occupation may be indicated with a starting resource block value (also referred to as a startingRB value) and a number of resource blocks value (also referred to as a nrofRBs value). The starting resource block value indicates a physical resource block (PRB) where the CSI measurement resource begins in relation to a common resource block #0 (CRB #0) on a common resource block grid. In some examples, only multiples of 4 may be allowed (e.g. 0, 4, . . . ). The number of resource blocks value indicates a number of PRBs across which the CSI measurement resource spans. In some examples, only multiples of 4 may be allowed. The smallest configurable number may be the minimum of 24 and the width of the associated BWP. If the configured value is larger than the width of the corresponding BWP, the UE may assume that the actual CSI-RS bandwidth is equal to the width of the BWP.

In some 5G NR networks, a reduced complexity UE may only support a single BWP, due to the limited computational memory of the reduced complexity UE. In these 5G NR networks, when a base station (e.g., gNB) desires the reduced complexity UE to measure CSI measurement resources (for L3 measurement or for Li scheduling purposes) for frequency domain (FD) resources outside of its current active BWP, the base station (e.g., gNB) may need to first reconfigure the current active BWP of the reduced complexity UE. However, since such reconfiguration of the current BWP would typically require an RRC reconfiguration, a relatively long configuration delay would be introduced thereby degrading the performance of the low complexity UE. In addition, such RRC reconfiguration of the current BWP may delay transmission of an accurate CSI report, which may further limit PDSCH performance in the new frequency domain (FD) resource.

The aspects described herein may reduce the previously discussed delays resulting from the reconfiguration of the current BWP and, therefore, may prevent degradation of the performance of the low complexity UE. In some aspects of the disclosure, periodic CSI-measurement gaps (CSI-MGs) for CSI reporting are introduced to avoid delays resulting from the reconfiguration of the current BWP.

Periodic Channel State Information (CSI) Measurement Gap

In some aspects of the present disclosure, and as described in greater detail with reference to FIGS. 4 and 5 below, a UE may be RRC configured with periodic CSI-Measurement Gaps (CSI-MGs) for CSI measurements outside of its current active BWP. In some examples, each periodic CSI-Measurement Gap (CSI-MG) may include a CSI-MG length (CSI-MGL), a CSI-MG repetition period (CSI-MGRP), and a CSI-MG time domain resource allocation (CSI-MG-TDRA). In some examples the CSI-MG length (CSI-MGL) may define a time domain (TD) duration of the CSI-MGL. The CSI-MG repetition period (CSI-MGRP) may define a repetition periodicity of the CSI-MGs. The CSI-MG time domain resource allocation (CSI-MG-TDRA) may define a starting symbol or slot of the CSI-MGs. In some aspects of the disclosure, the periodic CSI-MG may have a shorter length and/or repetition period as compared to other measurement gaps in conventional wireless communication networks. For example, the shorter length and/or repetition period of the periodic CSI-MG may be attributed to the shorter time domain (TD) duration and periodicity of a CSI reference signal as compared to the length and/or repetition period of synchronization signal blocks (SSBs).

In some aspects of the disclosure, a UE is not expected to transmit and/or receive with respect to its active BWP during the periodic CSI-Measurement Gaps (CSI-MGs). In one example, if the 5G NR network implements a time division duplex (TDD) scheme, both transmissions and receptions by the UE may not be expected. In another example, if the 5G NR network implements a frequency division duplex (FDD) scheme, only receptions by the UE are not expected, while transmissions by the UE may be expected. In another example, if FDD is implemented, both transmissions and receptions by the UE may not be expected. In some aspects, if UE receptions and/or transmissions are not expected in the active BWP due to CSI-MGs, then rate-matching and/or dropping of the corresponding DL/UL signal may be carried out. A UE may be RRC configured as to whether or not the UE is to carry out rate-matching and/or dropping. In some aspects of the disclosure, the UE may be configured with multiple periodic CSI-MG options. On or more of these multiple periodic CSI-MG options may be activated/deactivated at the UE. The UE may switch back to the active bandwidth part to perform receptions and/or transmissions after the end of each periodic CSI-MG.

Figure 4:
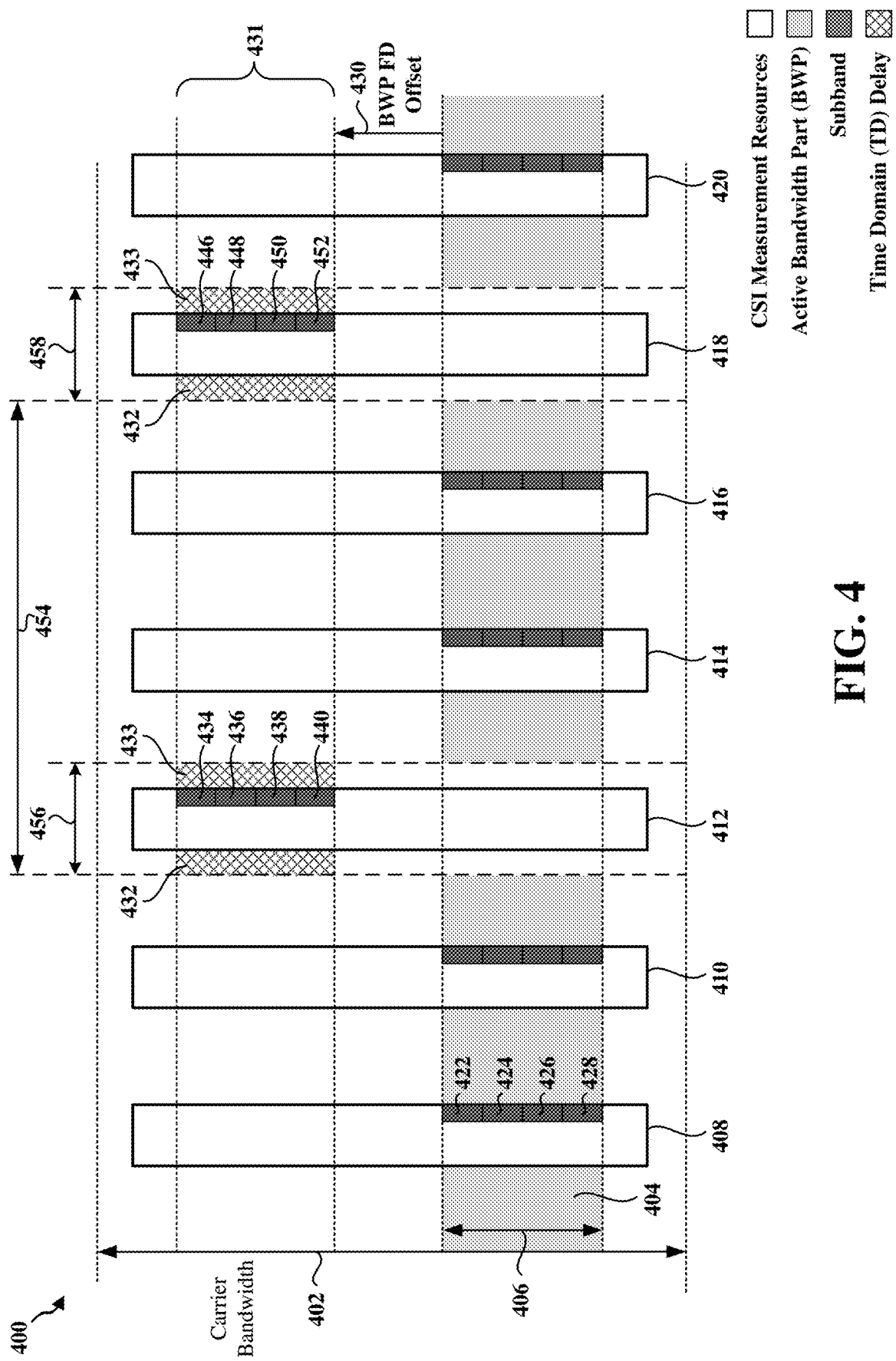
FIG. 4 is a diagram illustrating an example bandwidth part (BWP) frequency domain (FD) offset for periodic channel state information measurement gaps (CSI-MGs) in accordance with various aspects of the disclosure.

Bandwidth Part (BWP) Frequency Domain (FD) Offset for Periodic Channel State Information (CSI) Measurement Gaps FIG. 4 is a diagram 400 illustrating an example bandwidth part (BWP) frequency domain (FD) offset for periodic channel state information measurement gaps (CSI-MGs) in accordance with various aspects of the disclosure. As shown in FIG. 4, a cell in a 5G NR network having a carrier bandwidth 402 may configure a UE with an active BWP 404 (also referred to as the current active BWP 404). For example, the active BWP 404 may have a frequency range 406. As shown in FIG. 4, the 5G NR network may configure periodic channel state information (CSI) measurement resources 408, 410, 412, 414, 416, 418, and 420 within the carrier bandwidth 402. As further shown in FIG. 4, the CSI-MGL 456 overlaps the CSI measurement resource 412, and the CSI-MGL 458 overlaps the CSI measurement resource 418. The CSI-MGLs in FIG. 4 (e.g., CSI-MGL 456 and CSI-MGL 458) may have a repetition period CSI-MGRP 454.

In some aspects of the disclosure, for each periodic CSI-MG option, a base station (e.g., a gNB) may further configure a parameter to enable CSI-measurement and reporting for frequency domain (FD) resources outside of the current active BWP. For example, the parameter may be a frequency domain (FD) offset value relative to the current active BWP. Accordingly, in the aspects described herein, a BWP that has been offset relative to a current active BWP of the UE based on a frequency domain (FD) offset value may be referred to as an offset BWP. The frequency domain (FD) offset value may be a number of resource block groups (RBGs), where the size of each RBG is the same as the RBGs of the current active BWP of the UE. In some aspects, the offset BWP may maintain the same parameters (e.g., RRC configuration) as the current active BWP.

In some aspects of the disclosure, the UE may consider any active or triggered channel state information (CSI) report configuration linked with any CSI measurement resources that include time domain (TD) resources overlapping with the periodic channel state information measurement gaps (CSI-MGs) to be associated with the offset bandwidth part (BWP) instead of the current active bandwidth part (BWP). For example, the CSI measurement resources may include non-zero power channel state information reference signal (NZP-CSI-RS) resources and channel state information interference measurement (CSI-IM) resources). In some aspects of the disclosure, it may be the responsibility of a serving base station (e.g., gNB) to ensure that the frequency domain resource allocation (FDRA) (e.g., a channel state information (CSI) frequency occupation configuration) of such CSI measurement resources is located within the offset BWP.

In some examples, the UE may determine the reporting subband configuration for the current active BWP (e.g., based on the previously described CSI reporting band) and may apply the same reporting subband configuration for the offset BWP. In some examples, the UE may identify a reporting subband configuration for the offset BWP based on a CSI reporting band configuration dedicated for periodic CSI-MGs. In these examples, the reporting subband for the offset BWP may be different from the reporting subband configuration for the current active BWP.

With reference to FIG. 4, for example, a UE may consider an active or triggered channel state information (CSI) report configuration linked with the CSI measurement resources 412 and 418 to be associated with the offset bandwidth part (BWP) (e.g., BWPs offset by the BWP FD offset 430, such as the offset BWP 431 in FIG. 4) instead of the current active bandwidth part (BWP) (e.g., active BWP 404), because the time domain (TD) resources overlap with the respective periodic channel state information measurement gaps (CSI-MGLs) 456 and 458.

As shown in the example configuration of FIG. 4, the UE may determine the reporting subband configuration for the current active BWP 404 (e.g., based on the previously described CSI reporting band) including the subbands 422, 424, 426, 428 and may apply the same reporting subband configuration for the offset BWP. Accordingly, the UE may use the subbands 434, 436, 438, 440 in the offset BWP during the CSI-MGL 456, and may use the subbands 446, 448, 450, 452 in the offset BWP during the CSI-MGL 458.

In FIG. 4, the portion 432 may serve as a first time domain (TD) delay that allows the UE to tune its antennas for communication over the offset BWP, while the portion 433 may serve as a second TD delay that allows the UE to tune its antennas for communication over the active BWP 404

Implicit Indication of Measurement FD Resource

As described with reference to FIG. 5, in some aspects of the disclosure, a UE in a 5G NR network may be triggered with a CSI measurement resources (e.g., including non-zero power channel state information reference signal (NZP-CSI-RS) resources and channel state information interference measurement (CSI-IM) resources) during an activated periodic CSI-MG, where the frequency domain resource allocation (FDRA) (e.g., the previously described starting resource block value, number of resource blocks value, and the CSI frequency occupation) of the CSI measurement resources identifies frequency domain resources outside of the current active BWP of the UE. The UE may measure these CSI measurement resources although the frequency domain (FD) resource identified is outside of the current active BWP of the UE. The UE may determine the frequency domain (FD) range to be measured based on the starting resource block value, the number of resource blocks value, and the CSI frequency occupation of the CSI measurement resources.

Other activated/triggered CSI measurement resources including an FDRA overlapping with the current active BWP may not expected to be measured by the UE. The CSI report(s) associated with such CSI resources are also may not expected to be reported by the UE.

Figure 5:
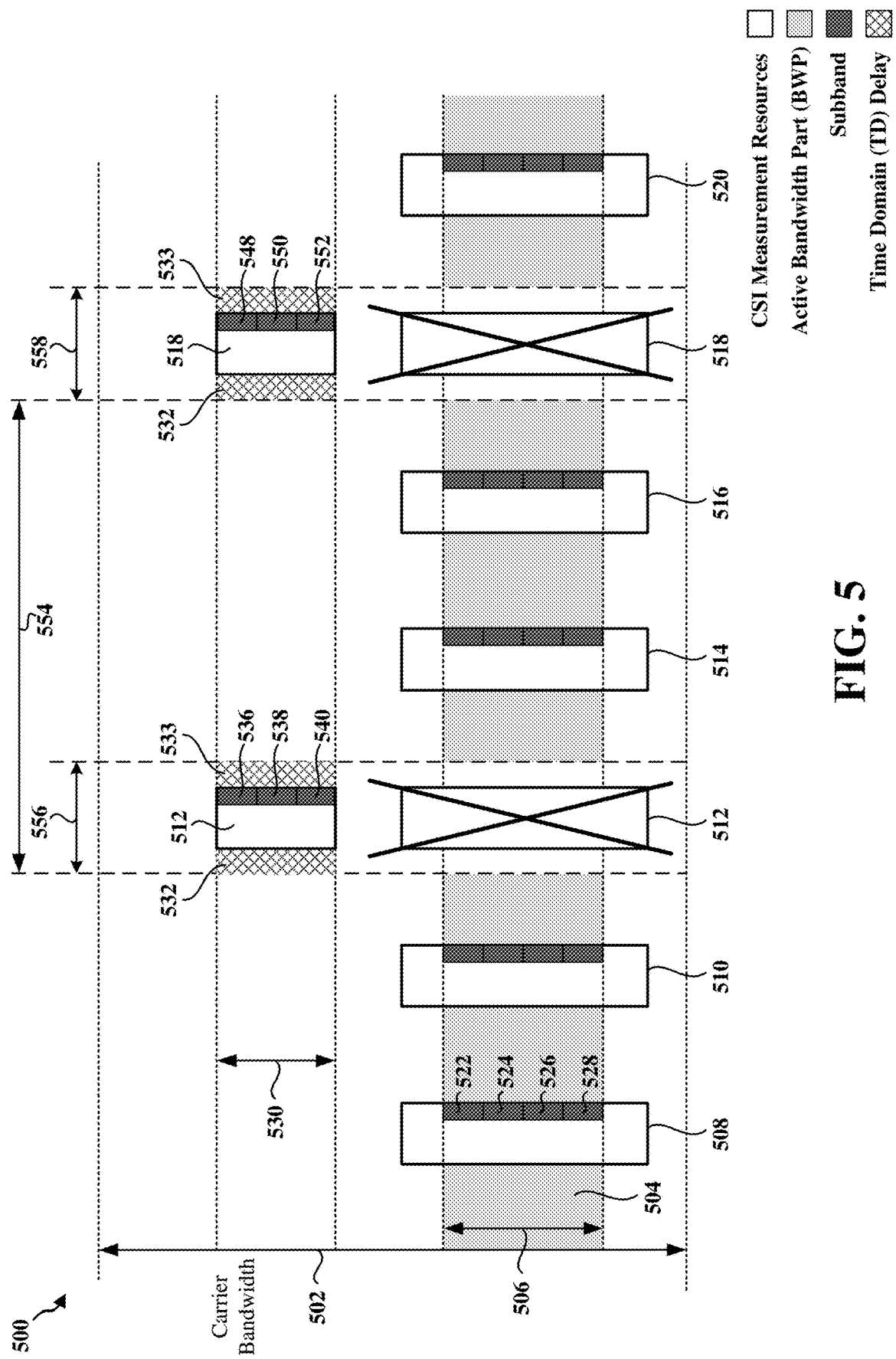
FIG. 5 is a diagram illustrating an implicit indication of measurement frequency domain (FD) resources in accordance with various aspects of the disclosure.

FIG. 5 is a diagram 500 illustrating an implicit indication of measurement frequency domain (FD) resources in accordance with various aspects of the disclosure. As shown in FIG. 5, a cell in a 5G NR network having a carrier bandwidth 502 may configure a UE with an active BWP 504 (also referred to as the current active BWP 504). As further shown in FIG. 5, the 5G NR network may configure periodic channel state information (CSI) measurement resources 508, 510, 512, 514, 516, 518, 520 within the carrier bandwidth 502. FIG. 5 includes an example configuration of a periodic CSI-MG (e.g., a CSI-MG with a CSI-MGL 556 and a CSI-MG with a CSI-MGL 558) having a repetition period CSI-MGRP 554.

In FIG. 5, portions of the channel state information (CSI) measurement resources 508, 510, 512, 514, 516, 518, 520 are within the current active BWP 504. For example, one or more subbands (e.g., subbands 522, 524, 526, 528) may be indicated to the UE in a CSI reporting band defined in a corresponding CSI report configuration.

With reference to FIG. 5, during an activated periodic CSI-MG (e.g., within the CSI-MGL 556), the frequency domain resource allocation (FDRA) (e.g., the previously described starting resource block value, number of resource blocks value, and the CSI frequency occupation) of the CSI measurement resources (e.g., the CSI measurement resources 512, 518) identifies a frequency domain (FD) range 530 outside of the current active BWP 504 of the UE. Therefore, the UE may measure these CSI resources 512, 518 although the frequency domain (FD) resource identified is outside of the current active BWP 504 of the UE. For example, the UE may determine the frequency domain (FD) range 530 to be measured based on the starting resource block value, the number of resource blocks value, and the CSI frequency occupation of the CSI resources.

In some aspects of the disclosure, the UE may not measure CSI measurement resources within the active BWP 504 (e.g., the crossed out CSI measurement resources 512, 518 in FIG. 5) when a frequency domain resource allocation (FDRA) outside the active BWP 504 (e.g., an FDRA within the FD range 530) is present. Moreover, in these aspects, the UE may not be required to transmit a CSI report.

In some examples, and as shown in FIG. 5, the subbands (e.g., subbands 536, 538, 540 and subbands 548, 550, 552) for which the UE may report channel state information (CSI) may be indicated to the UE in a CSI reporting band defined in a corresponding CSI report configuration.

In FIG. 5, the portions 532 may serve as a first time domain (TD) delay that allows the UE to tune its antennas for communication within the FD range 530, while the portions 533 may serve as a second TD delay that allows the UE to tune its antennas for communication over the active BWP 504.

In some examples, a UE in a 5G NR network may report one or more of the following capabilities of the UE: a) whether periodic CSI-MGs are supported b) time domain (TD) radio frequency retuning capabilities (e.g., RF retuning time domain (TD) duration from the active BWP to the offset BWP, RF retuning time domain (TD) duration from the offset BWP to the active BWP) c) frequency domain (FD) radio frequency (RF) retuning capabilities. In some examples, the RF retuning time domain (TD) duration from the active BWP to the offset BWP and the RF retuning time domain (TD) duration from the offset BWP to the active BWP may be reported as a same value or different values. In some examples, the frequency domain radio frequency retuning capabilities may include the maximum frequency domain offset value supported for a BWP.

Figure 6:
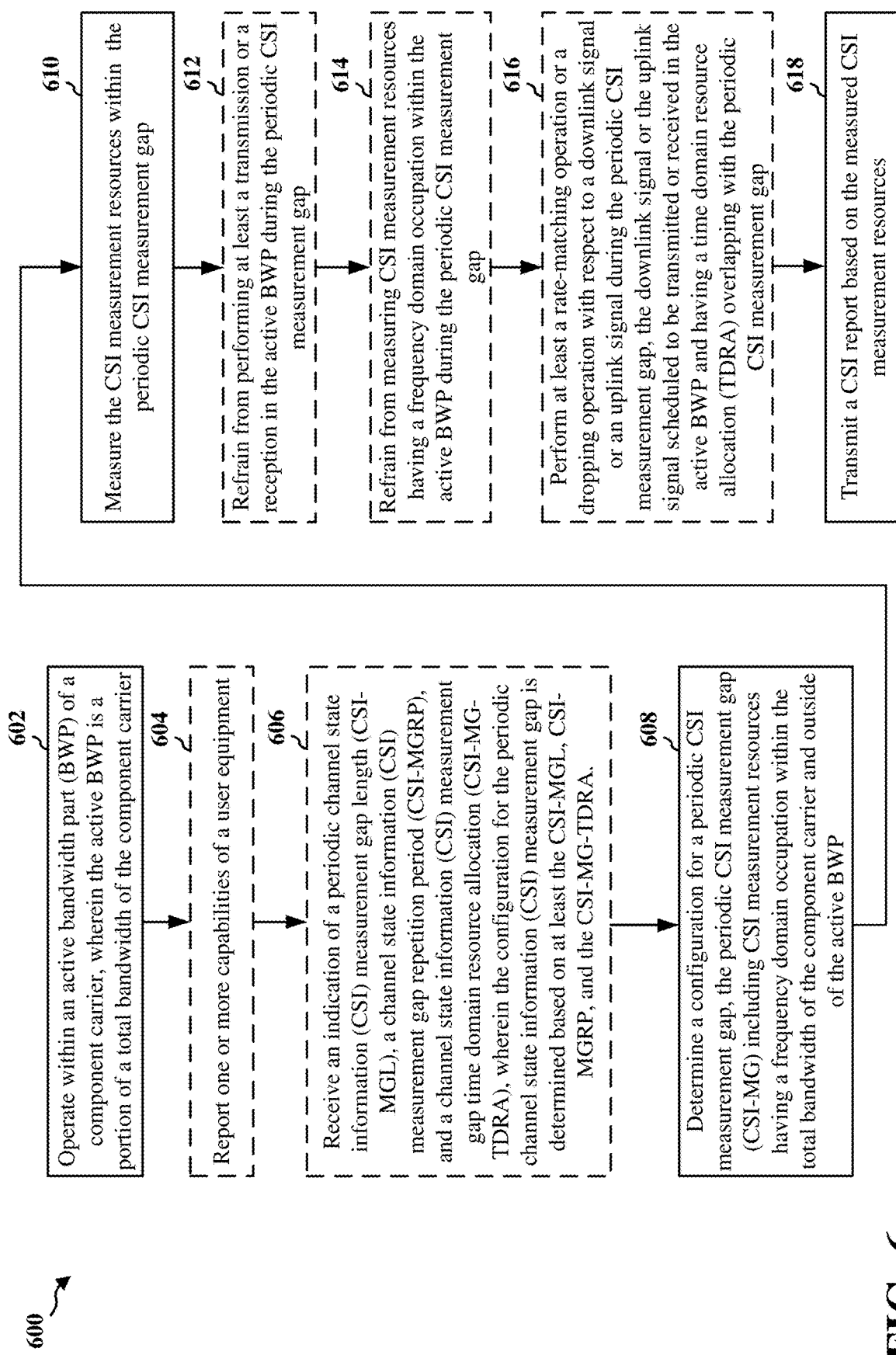
FIG. 6 is a flowchart of a method of wireless communication.

FIG. 6 is a flowchart 600 of a method of wireless communication. The method may be performed by a UE (e.g., the UE 104; the apparatus 702/702'; the processing system 814, which may include the memory 360 and which may be the entire UE 104 or a component of the UE 104, such as the TX processor 368, the RX processor 356, and/or the controller/processor 359).

At 602, the UE operates within an active bandwidth part (BWP) of a component carrier, wherein the active BWP is a portion of a total bandwidth of the component carrier. For example, the active BWP may include the active BWP 404 in FIG. 4 or the active BWP 504 in FIG. 5.

At 604, the UE reports one or more capabilities of the UE. The one or more capabilities including at least information indicating whether the periodic channel state information (CSI) measurement gap is supported, frequency domain (FD) radio frequency (RF) retuning capabilities, and time domain radio frequency retuning capabilities including a minimum supported value for a first time domain (TD) duration from the active BWP to the frequency domain occupation and a minimum supported value for a second time domain (TD) duration from the frequency domain occupation to the active BWP. The values for the first and the second TD durations may be reported as a same value.

At 606, the UE receives an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA). For example, the CSI-MGL may be the CSI-MGL 456, 458 in FIG. 4 or the CSI-MGL 556, 558 in FIG. 5. In some examples, the CSI-MGL 456 may be equal to the CSI-MGL 458, and the CSI-MGL 556 may be equal to the CSI-MGL 558. For example, the CSI-MGRP may be the CSI-MGRP 454 in FIG. 4 or the CSI-MGRP 554 in FIG. 5.

At 608, the UE determines a configuration for a periodic channel state information (CSI) measurement gap, the periodic channel state information (CSI) measurement gap (CSI-MG) (the CSI-MGL 456 in FIG. 4 or the CSI-MGL 556 in FIG. 5) including channel state information (CSI) measurement resources (e.g., the CSI measurement resources 412 in FIG. 4 or the CSI measurement resources 512 in FIG. 5) having a frequency domain occupation within the total bandwidth (e.g., the carrier bandwidth 402 or 502) of the component carrier and outside of the active BWP. The configuration for the periodic channel state information (CSI) measurement gap may be determined based on at least the CSI-MGL, CSI-MGRP, and the CSI-MG-TDRA.

In some aspects of the disclosure, the UE determines the configuration for the periodic channel state information (CSI) measurement gap by receiving one or more periodic channel state information measurement gap (CSI-MG) options, each of the periodic CSI-MG options including a frequency domain (FD) offset value (e.g., the BWP FD offset 430 in FIG. 4) relative to the active bandwidth part (BWP) (e.g., the active BWP 404 in FIG. 4), and determining an offset bandwidth part (BWP) (e.g., the offset BWP 431 in FIG. 4) based on the frequency domain (FD) offset value.

The one or more channel state information (CSI) measurement resources may have a frequency domain occupation within the offset bandwidth part (BWP) (e.g., the BWP FD offset 430 in FIG. 4), where the offset bandwidth part (BWP) and the active bandwidth part (BWP) are nonoverlapping. For example, the one or more of the channel state information (CSI) measurement resources may include non-zero power channel state information reference signal (NZP-CSI-RS) resources or channel state information interference measurement (CSI-IM) resources. In some aspects, the frequency domain (FD) offset value indicates a number of resource block groups (RBGs). For example, each of the number of resource block groups (RBGs) indicated by the frequency domain (FD) offset value may have a same size as each resource block group (RBG) in the active bandwidth part (BWP). In some aspects, the offset bandwidth part (BWP) maintains same parameters as the active bandwidth part (BWP).

In some aspects of the disclosure, the UE determines the configuration for the periodic channel state information (CSI) measurement gap by receiving a frequency domain resource allocation (FDRA) of the channel state information (CSI) measurement resources, wherein the frequency domain resource allocation (FDRA) identifies frequency domain resources (e.g., the frequency domain (FD) range 530 in FIG. 5) outside of the active bandwidth part (e.g., the active BWP 504 in FIG. 5).

At 610, the UE measures the channel state information (CSI) measurement resources within the periodic channel state information (CSI) measurement gap. In some aspects of the disclosure, the UE measures the channel state information (CSI) measurement resources included in the periodic channel state information (CSI) measurement gap by determining a subband configuration indicating one or more subbands for measurement of the channel state information (CSI) measurement resources within the periodic channel state information (CSI) measurement gap, and measuring the channel state information (CSI) measurement resources included in the periodic channel state information (CSI) measurement gap based on the one or more subbands. In some aspects of the disclosure, the UE determines the subband configuration by identifying a first subband configuration associated with the active BWP, or by identifying a second subband configuration associated with the periodic channel state information (CSI) measurement gap.

In some aspects of the disclosure, the UE measures the channel state information (CSI) measurement resources included in the periodic channel state information (CSI) measurement gap by receiving the channel state information (CSI) measurement resources during the periodic channel state information (CSI) measurement gap. The UE determines the frequency domain occupation (e.g., the frequency domain (FD) range 530) of the channel state information (CSI) measurement resources from a starting physical resource block (PRB) value and a number of PRBs value configured for the channel state information (CSI) measurement resources, wherein the determined frequency domain occupation of each of the channel state information (CSI) measurement resources are nonoverlapping with the active BWP. The UE measures the channel state information (CSI) measurement resources based on the determined frequency domain occupation. The UE measures the channel state information (CSI) measurement resources notwithstanding that the frequency domain occupation of the channel state information (CSI) measurement resources is nonoverlapping with the active BWP.

At 612, the UE refrains from performing at least a transmission or a reception in the active bandwidth part (BWP) during the periodic channel state information (CSI) measurement gap.

At 614, the UE refrains from measuring channel state information (CSI) measurement resources having a frequency domain occupation within the active bandwidth part (BWP) during the periodic channel state information (CSI) measurement gap.

At 616, the UE performs at least a rate-matching operation or a dropping operation with respect to a downlink signal or an uplink signal during the periodic channel state information (CSI) measurement gap, the downlink signal or the uplink signal scheduled to be transmitted or received in the active BWP and having a time domain resource allocation (TDRA) overlapping with the periodic channel state information (CSI) measurement gap.

Finally, at 618, the UE transmits a channel state information (CSI) report based on the measured channel state information (CSI) measurement resources.

Figure 7:
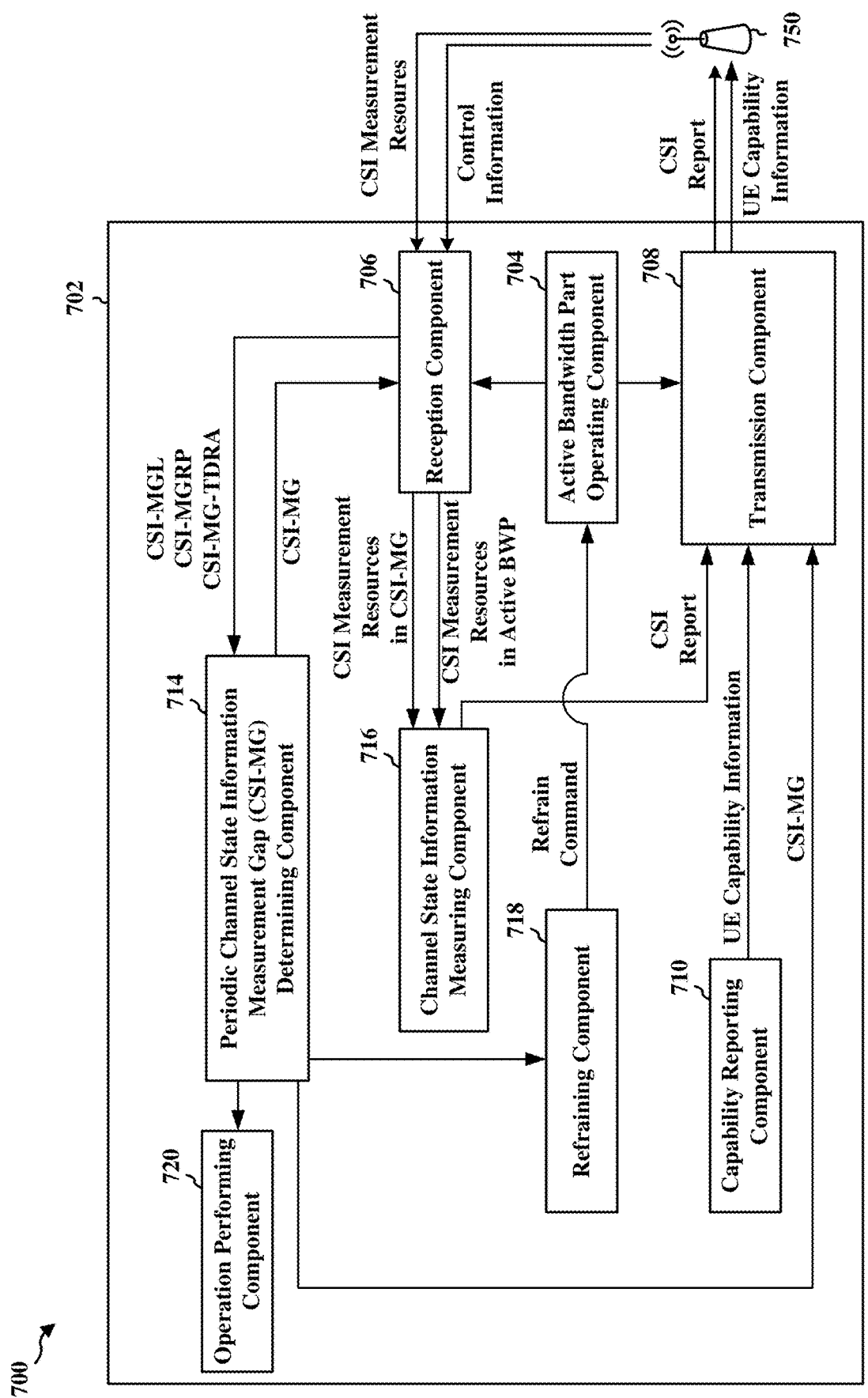
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE. The apparatus includes an active bandwidth part operating component 704 that operates the UE within an active bandwidth part (BWP) of a component carrier, where the active BWP is a portion of a total bandwidth of the component carrier. The apparatus further includes a reception component 706 that receives an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA). In some aspects, the reception component 706 receives one or more periodic channel state information measurement gap (CSI-MG) options, each of the periodic CSI-MG options including a frequency domain (FD) offset value relative to the active bandwidth part (BWP). In some aspects, the reception component 706 receives a frequency domain resource allocation (FDRA) of the channel state information (CSI) measurement resources, where the frequency domain resource allocation (FDRA) identifies frequency domain resources outside of the active bandwidth part. In some aspects, the reception component 706 receives the channel state information (CSI) measurement resources during the periodic channel state information (CSI) measurement gap.

The apparatus further includes a transmission component 708 that transmits a channel state information (CSI) report based on the measured channel state information (CSI) measurement resources.

The apparatus further includes a capability reporting component 710 that reports one or more capabilities of a user equipment.

The apparatus further includes a periodic channel state information measurement gap (CSI-MG) determining component 714 that determines a configuration for a periodic channel state information (CSI) measurement gap. The periodic channel state information (CSI) measurement gap (CSI-MG) includes channel state information (CSI) measurement resources having a frequency domain occupation within the total bandwidth of the component carrier and outside of the active BWP. In some aspects, the periodic channel state information measurement gap (CSI-MG) determining component 714 determines an offset bandwidth part (BWP) based on the frequency domain (FD) offset value.

The apparatus further includes a channel state information (CSI) measuring component 716 that measures the channel state information (CSI) measurement resources within the periodic channel state information (CSI) measurement gap. In some aspects, the channel state information (CSI) measuring component 716 measures the CSI measurement resources by considering the CSI measurement resources being associated with the offset BWP A refraining component 718 that refrains from performing at least a transmission or a reception in the active bandwidth part (BWP) during the periodic channel state information (CSI) measurement gap, and refrains from measuring channel state information (CSI) measurement resources having a frequency domain occupation within the active bandwidth part (BWP) during the periodic channel state information (CSI) measurement gap.

The apparatus further includes an operation performing component 720 that performs at least a rate-matching operation or a dropping operation with respect to a downlink signal or an uplink signal during the periodic channel state information (CSI) measurement gap. The downlink signal or the uplink signal may be scheduled to be transmitted or received in the active BWP and may have a time domain resource allocation (TDRA) overlapping with the periodic channel state information (CSI) measurement gap.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
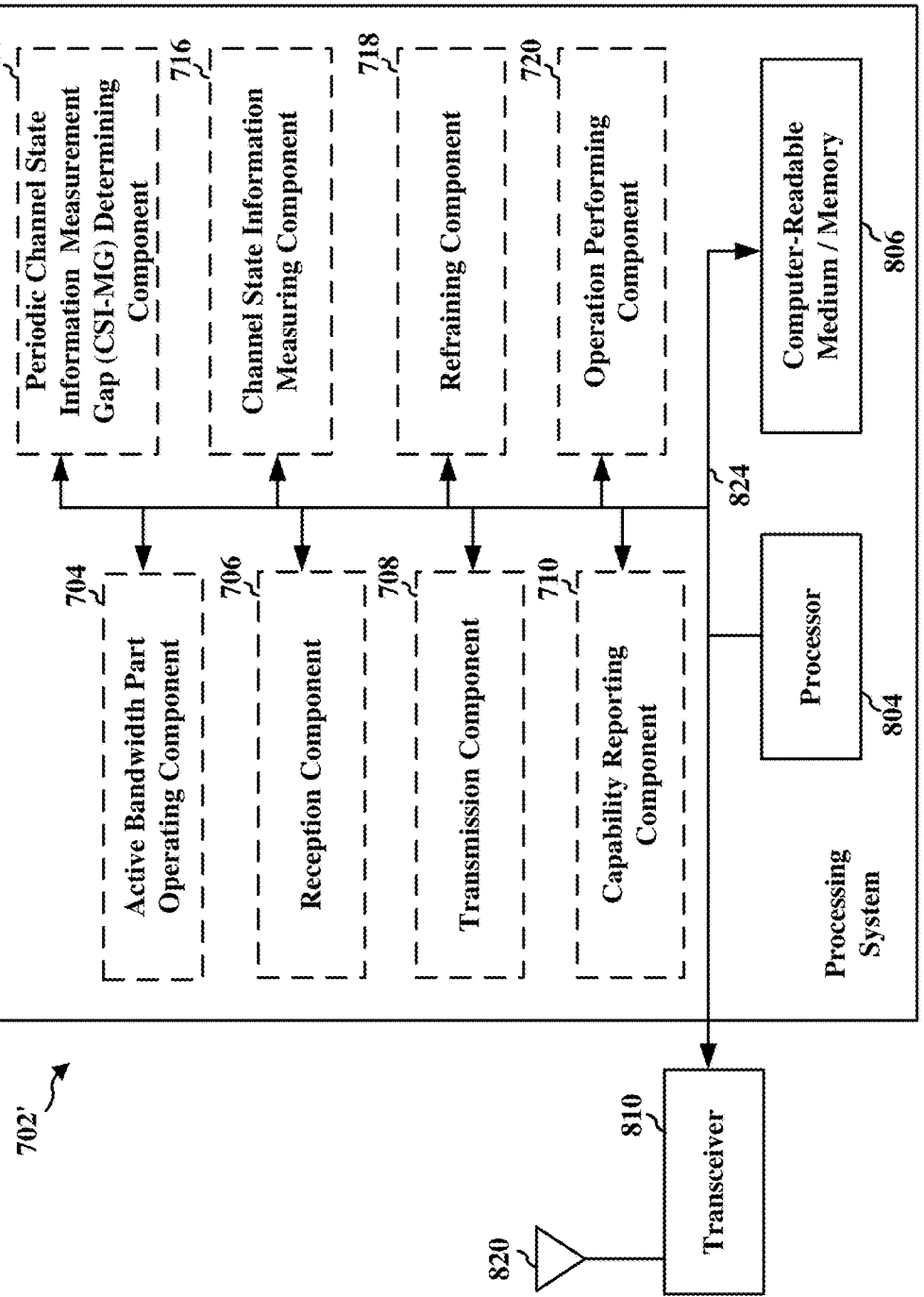
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 714, 716, 718 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 706. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 714, 716, 718. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for operating within an active BWP of a component carrier, wherein the active BWP is a portion of a total bandwidth of the component carrier, means for determining a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the active BWP, means for measuring the channel state information (CSI) measurement resources within the periodic channel state information (CSI) measurement gap, means for transmitting a channel state information (CSI) report based on the measured channel state information (CSI) measurement resources, means for receiving an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA), means for refraining from performing at least a transmission or a reception in the active bandwidth part (BWP) during the periodic channel state information (CSI) measurement gap, means for refraining from measuring channel state information (CSI) measurement resources having a frequency domain occupation within the active bandwidth part (BWP) during the periodic channel state information (CSI) measurement gap, means for performing at least a rate-matching operation or a dropping operation with respect to a downlink signal or an uplink signal during the periodic channel state information (CSI) measurement gap, the downlink signal or the uplink signal scheduled to be transmitted or received in the active BWP and having a time domain resource allocation (TDRA) overlapping with the periodic channel state information (CSI) measurement gap, and means for reporting one or more capabilities of a user equipment. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C." and "A, B, C, or any combination thereof" include any combination of A, B. and/or C. and may include multiples of A, multiples of B. or multiples of C. Specifically, combinations such as "at least one of A. B, or C." "one or more of A. B, or C." "at least one of A, B. and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device." and the like may not be a substitute for the word "means." As such, no claim element is to be construed as a means plus function unless the element is expressly recited using the phrase "means for."

What is claimed is:

1. A method of wireless communication at a user equipment (UE), comprising:
   operating within an active bandwidth part (BWP) of a component carrier, wherein the UE is configured with a single BWP that includes the active BWP, and wherein the active BWP is a portion of a total bandwidth of the component carrier;
   determining a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the single BWP that includes the active BWP;
   measuring the channel state information (CSI) measurement resources within the periodic channel state information (CSI) measurement gap; and
   transmitting a channel state information (CSI) report based on the measured channel state information (CSI) measurement resources.

2. The method of claim 1, further comprising:
   receiving an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA), wherein the configuration for the periodic channel state information (CSI) measurement gap is determined based on at least the CSI-MGL, CSI-MGRP, and the CSI-MG-TDRA.

3. The method of claim 1, further comprising:
   refraining from performing at least a transmission or a reception in the active bandwidth part (BWP) during the periodic channel state information (CSI) measurement gap.

4. The method of claim 1, further comprising:
   refraining from measuring channel state information (CSI) measurement resources having a frequency domain occupation within the active bandwidth part (BWP) during the periodic channel state information (CSI) measurement gap.

5. The method of claim 1, further comprising:
   performing at least a rate-matching operation or a dropping operation with respect to a downlink signal or an uplink signal during the periodic channel state information (CSI) measurement gap, the downlink signal or the uplink signal scheduled to be transmitted or received in the active BWP and having a time domain resource allocation (TDRA) overlapping with the periodic channel state information (CSI) measurement gap.

6. The method of claim 1, wherein the determining the configuration for the periodic channel state information (CSI) measurement gap includes:
   receiving one or more periodic channel state information measurement gap (CSI-MG) options, each of the periodic CSI-MG options including a frequency domain (FD) offset value relative to the active bandwidth part (BWP);
   determining an offset bandwidth part (BWP) based on the frequency domain (FD) offset value, the one or more channel state information (CSI) measurement resources having a frequency domain occupation within the offset bandwidth part (BWP), wherein the offset bandwidth part (BWP) and the active bandwidth part (BWP) are nonoverlapping; and measuring the CSI measurement resources by considering the CSI measurement resources being associated with the offset BWP.

7. The method of claim 6, wherein the one or more of the channel state information (CSI) measurement resources includes non-zero power channel state information reference signal (NZP-CSI-RS) resources or channel state information interference measurement (CSI-IM) resources.

8. The method of claim 6, wherein the frequency domain (FD) offset value indicates a number of resource block groups (RBGs).

9. The method of claim 8, wherein each of the number of resource block groups (RBGs) indicated by the frequency domain (FD) offset value has a same size as each resource block group (RBG) in the active bandwidth part (BWP).

10. The method of claim 8, wherein the offset bandwidth part (BWP) maintains same parameters as the active bandwidth part (BWP).

11. The method of claim 1, wherein the measuring the channel state information (CSI) measurement resources included in the periodic channel state information (CSI) measurement gap includes:
determining a subband configuration indicating one or more subbands for measurement of the channel state information (CSI) measurement resources within the periodic channel state information (CSI) measurement gap; and
measuring the channel state information (CSI) measurement resources included in the periodic channel state information (CSI) measurement gap based on the one or more subbands.

12. The method of claim 11, wherein the determining the subband configuration includes:
identifying a first subband configuration associated with the active BWP; or
identifying a second subband configuration associated with the periodic channel state information (CSI) measurement gap.

13. The method of claim 1, wherein the determining the configuration for a periodic channel state information (CSI) measurement gap includes:
receiving a frequency domain resource allocation (FDRA) of the channel state information (CSI) measurement resources, wherein the frequency domain resource allocation (FDRA) identifies frequency domain resources outside of the active bandwidth part.

14. The method of claim 1, wherein the measuring the channel state information (CSI) measurement resources included in the periodic channel state information (CSI) measurement gap includes:
receiving the channel state information (CSI) measurement resources during the periodic channel state information (CSI) measurement gap;
determining the frequency domain occupation of the channel state information (CSI) measurement resources from a starting physical resource block (PRB) value and a number of PRBs value configured for the channel state information (CSI) measurement resources, wherein the determined frequency domain occupation of each of the channel state information (CSI) measurement resources are nonoverlapping with the active BWP; and measuring the channel state information (CSI) measurement resources based on the determined frequency domain occupation.

15. The method of claim 14, wherein the measuring the channel state information (CSI) measurement resources is performed notwithstanding that the frequency domain occupation of the channel state information (CSI) measurement resources is nonoverlapping with the active BWP.

16. The method of claim 1, further comprising:
reporting one or more capabilities of a user equipment, the one or more capabilities including at least information indicating whether the periodic channel state information (CSI) measurement gap is supported, frequency domain (FD) radio frequency (RF) retuning capabilities, and time domain radio frequency retuning capabilities including a minimum supported value for a first time domain (TD) duration from the active BWP to the frequency domain occupation and a minimum supported value for a second time domain (TD) duration from the frequency domain occupation to the active BWP, wherein the values for the first and the second TD durations are reported as a same value.

17. An apparatus for wireless communication, comprising:
a memory; and
at least one processor coupled to the memory and configured to:
operate within an active bandwidth part (BWP) of a component carrier, wherein the apparatus is configured with a single BWP that includes the active BWP, and wherein the active BWP is a portion of a total bandwidth of the component carrier;
determine a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the single BWP that includes the active BWP;
measure the channel state information (CSI) measurement resources within the periodic channel state information (CSI) measurement gap; and
transmit a channel state information (CSI) report based on the measured channel state information (CSI) measurement resources.

18. The apparatus of claim 17, wherein the at least one processor is further configured to:
receive an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA), wherein the configuration for the periodic channel state information (CSI) measurement gap is determined based on at least the CSI-MGL, CSI-MGRP, and the CSI-MG-TDRA.

19. The apparatus of claim 17, wherein the at least one processor is further configured to:
refrain from performing at least a transmission or a reception in the active bandwidth part (BWP) during the periodic channel state information (CSI) measurement gap.

20. The apparatus of claim 17, wherein the at least one processor is further configured to:
refrain from measuring channel state information (CSI) measurement resources having a frequency domain occupation within the active bandwidth part (BWP) during the periodic channel state information (CSI) measurement gap.

21. The apparatus of claim 17, wherein the at least one processor is further configured to:
perform at least a rate-matching operation or a dropping operation with respect to a downlink signal or an uplink signal during the periodic channel state information (CSI) measurement gap, the downlink signal or the uplink signal scheduled to be transmitted or received in the active BWP and having a time domain resource allocation (TDRA) overlapping with the periodic channel state information (CSI) measurement gap.

22. The apparatus of claim 17, wherein the at least one processor configured to determine the configuration for the periodic channel state information (CSI) measurement gap is further configured to:
receive one or more periodic channel state information measurement gap (CSI-MG) options, each of the periodic CSI-MG options including a frequency domain (FD) offset value relative to the active bandwidth part (BWP);
determine an offset bandwidth part (BWP) based on the frequency domain (FD) offset value, the one or more channel state information (CSI) measurement resources having a frequency domain occupation within the offset bandwidth part (BWP), wherein the offset bandwidth part (BWP) and the active bandwidth part (BWP) are nonoverlapping; and
measure the CSI measurement resources by considering the CSI measurement resources being associated with the offset BWP.

23. The apparatus of claim 22, wherein the one or more of the channel state information (CSI) measurement resources includes non-zero power channel state information reference signal (NZP-CSI-RS) resources or channel state information interference measurement (CSI-IM) resources.

24. The apparatus of claim 22, wherein the frequency domain (FD) offset value indicates a number of resource block groups (RBGs).

25. The apparatus of claim 24, wherein each of the number of resource block groups (RBGs) indicated by the frequency domain (FD) offset value has a same size as each resource block group (RBG) in the active bandwidth part (BWP).

26. The apparatus of claim 24, wherein the offset bandwidth part (BWP) maintains same parameters as the active bandwidth part (BWP).

27. The apparatus of claim 17, wherein the at least one processor further configured to measure the channel state information (CSI) measurement resources included in the periodic channel state information (CSI) measurement gap is further configured to:
determine a subband configuration indicating one or more subbands for measurement of the channel state information (CSI) measurement resources within the periodic channel state information (CSI) measurement gap; and
measure the channel state information (CSI) measurement resources included in the periodic channel state information (CSI) measurement gap based on the one or more subbands.

28. The apparatus of claim 27, wherein the at least one processor configured to determine the subband configuration is further configured to:
identify a first subband configuration associated with the active BWP; or
identify a second subband configuration associated with the periodic channel state information (CSI) measurement gap.

29. The apparatus of claim 17, wherein the at least one processor configured to determine the configuration for the periodic channel state information (CSI) measurement gap is further configured to:
receive a frequency domain resource allocation (FDRA) of the channel state information (CSI) measurement resources, wherein the frequency domain resource allocation (FDRA) identifies frequency domain resources outside of the active bandwidth part.

30. The apparatus of claim 17, wherein the at least one processor configured to measure the channel state information (CSI) measurement resources included in the periodic channel state information (CSI) measurement gap is further configured to:
receive the channel state information (CSI) measurement resources during the periodic channel state information (CSI) measurement gap;
determine the frequency domain occupation of the channel state information (CSI) measurement resources from a starting physical resource block (PRB) value and a number of PRBs value configured for the channel state information (CSI) measurement resources, wherein the determined frequency domain occupation of each of the channel state information (CSI) measurement resources are nonoverlapping with the active BWP; and
measure the channel state information (CSI) measurement resources based on the determined frequency domain occupation.

31. The apparatus of claim 17, wherein the at least one processor is configured to measure the channel state information (CSI) measurement resources notwithstanding that the frequency domain occupation of the channel state information (CSI) measurement resources is nonoverlapping with the active BWP.

32. The apparatus of claim 17, wherein the at least one processor is configured to:
report one or more capabilities of a user equipment, the one or more capabilities including at least information indicating whether the periodic channel state information (CSI) measurement gap is supported, frequency domain (FD) radio frequency (RF) retuning capabilities, and time domain radio frequency retuning capabilities including a minimum supported value for a first time domain (TD) duration from the active BWP to the frequency domain occupation and a minimum supported value for a second time domain (TD) duration from the frequency domain occupation to the active BWP, wherein the values for the first and the second TD durations are reported as a same value.

33. An apparatus for wireless communication, comprising:
means for operating within an active bandwidth part (BWP) of a component carrier, wherein the apparatus is configured with a single BWP that includes the active BWP, and wherein the active BWP is a portion of a total bandwidth of the component carrier;
means for determining a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the single BWP that includes the active BWP;

means for measuring the channel state information (CSI) measurement resources within the periodic channel state information (CSI) measurement gap; and means for transmitting a channel state information (CSI) report based on the measured channel state information (CSI) measurement resources.

34. The apparatus of claim 33, further comprising:

means for receiving an indication of a periodic channel state information (CSI) measurement gap length (CSI-MGL), a channel state information (CSI) measurement gap repetition period (CSI-MGRP), and a channel state information (CSI) measurement gap time domain resource allocation (CSI-MG-TDRA), wherein the configuration for the periodic channel state information (CSI) measurement gap is determined based on at least the CSI-MGL, CSI-MGRP, and the CSI-MG-TDRA.

35. A non-transitory computer-readable medium storing computer executable code, the code when executed by a processor of a user equipment (UE) cause the processor to:

operate within an active bandwidth part (BWP) of a component carrier, wherein the UE is configured with a single BWP that includes the active BWP, and wherein the active BWP is a portion of a total bandwidth of the component carrier;

determine a configuration for a periodic channel state information (CSI) measurement gap, the periodic channel state information (CSI) measurement gap (CSI-MG) including channel state information (CSI) measurement resources having a frequency domain occupation within the total bandwidth of the component carrier and outside of the single BWP that includes the active BWP;

measure the channel state information (CSI) measurement resources within the periodic channel state information (CSI) measurement gap; and transmit a channel state information (CSI) report based on the measured channel state information (CSI) measurement resources.

* * * * *